United States Patent [19]

Rooney

[11] 3,909,225

[45] Sept. 30, 1975

[54] CRYOGENIC DEWAR

[75] Inventor: Robert Edward Rooney, Danvers, Mass.

[73] Assignees: Robert Edward Rooney, Danvers, Mass.; RCA Corporation, New York, N.Y.

[22] Filed: May 3, 1974

[21] Appl. No.: 466,725

[52] U.S. Cl. .................... 62/514; 174/15 C; 313/22

[51] Int. Cl.² .......................................... F25B 19/00

[58] Field of Search ............ 62/514, 62, 45; 313/11, 313/22, 23, 24; 174/15 C

[56] References Cited

UNITED STATES PATENTS

| | | | |
|---|---|---|---|
| 3,261,180 | 7/1966 | Porter | 62/514 |
| 3,280,593 | 10/1966 | Konkel | 62/514 |
| 3,315,478 | 4/1967 | Walsh | 62/514 |
| 3,756,040 | 9/1973 | Westling | 62/514 |

*Primary Examiner*—William F. O'Dea
*Assistant Examiner*—Ronald C. Capossela
*Attorney, Agent, or Firm*—Edward J. Norton; William Squire

[57] ABSTRACT

A cryogenic dewar comprises a first chamber thermally insulated from the ambient and a second chamber disposed within the first chamber. A cooling head means forms one wall of the second chamber. The cooling head means includes structure solely within the second chamber by which the head means can be cooled and provides a surface external to the second chamber upon which a device to be cooled can be thermally conductively mounted. The cooling structure disposed within the second chamber includes a plurality of cooling conduits for receiving liquid nitrogen, the conduits having different lengths for regulating the pressure of the nitrogen flowing therein.

12 Claims, 3 Drawing Figures

CRYOGENIC DEWAR

This invention was made in the course of or during work performed for the Department of the Army.

BACKGROUND OF THE INVENTION

The present invention relates to providing cryogenic cooling in a dewar using a liquid that flows at cryogenic temperatures. Cryogenic dewars are especially useful for cooling laser diode arrays. These diodes, particularly GaAs diodes, are utilized according to known laser techniques when the diodes are operated at cryogenic temperatures. However, these diodes when operating dissipate large amounts of energy and require efficient cooling.

Such cooling usually takes place in a dewar comprising an outer insulated chamber and an inner chamber in which liquid nitrogen is supplied. The diode array is mounted thermally condutive externally to an inner chamber wall. Adjacent to this wall within the inner chamber is a cold head having a plurality of fins or the like which are immersed in liquid nitrogen within the inner chamber. The heat is transferred from the diode array to the inner chamber wall and thence to the cooling head disposed within the inner chamber for cooling by way of evaporation of the liquid nitrogen. Liquid nitrogen after evaporation is vented to the atmosphere or otherwise handled by conventional means.

The usual procedure for cooling with liquid nitrogen is to expose the cooling head or plate to the liquid nitrogen directly within a sealed chamber. To increase the exposure area of the cooling head to the liquid nitrogen, fins or protrusions have been fabricated in the cooling head. However, in certain instances, it is desirable to provide even greater cooling than that provided by this structure. To do so efficiently has been both complex and costly.

One solution to increasing the cooling effect would be to increase the flow rate of the liquid nitrogen. This increase of flow, however, would expel the liquid nitrogen to the atmosphere. With a limited supply of nitrogen available aboard a spacecraft in which laser diodes are used, for example, such a solution is not desirable. Further, the amount of area on the cold head that could be exposed to liquid nitrogen is limited in the prior art devices by the general shape and configuration of the fins on the cold head. Therefore, for a given size dewar, a limited amount of cooling is achieved with liquid nitrogen in accordance with prior art arrangements.

SUMMARY OF THE INVENTION

An apparatus for cryogenic cooling of a device mounted in thermal conductivity therewith comprises a first chamber thermally insulated from the ambient surrounding the first chamber. A second chamber is disposed within the first chamber. A thermally conductive heat transfer member including cooling means is disposed within the second chamber. The member has a surface external of the second chamber thermally conductive with the cooling means, the member being arranged so that the device can be thermally conductively mounted on that surface. The cooling means of the member includes a plurality of conduits within the member, each conduit terminating at one end within the second chamber. The conduits terminate in communication with each other at their other ends within the member. Inlet means for receiving a cryogenic cooling liquid are provided at the other ends of the conduits. The second chamber includes exhaust means for exhausting in the evaporated state the received liquid which has passed from the inlet means through the conduits to the second chamber.

IN THE DRAWINGS

FIG. 1 is a sectional elevational view of an apparatus constructed in accordance with an embodiment of the invention, FIG. 2 is a sectional plan view of the heat transfer member of FIG. 1 taken along lines 2—2 of FIG. 1, and FIG. 3 is an additional sectional plan view of the heat transfer member of FIG. 1 taken along lines 3—3 of FIG. 1.

DETAILED DESCRIPTION

Figure 1:
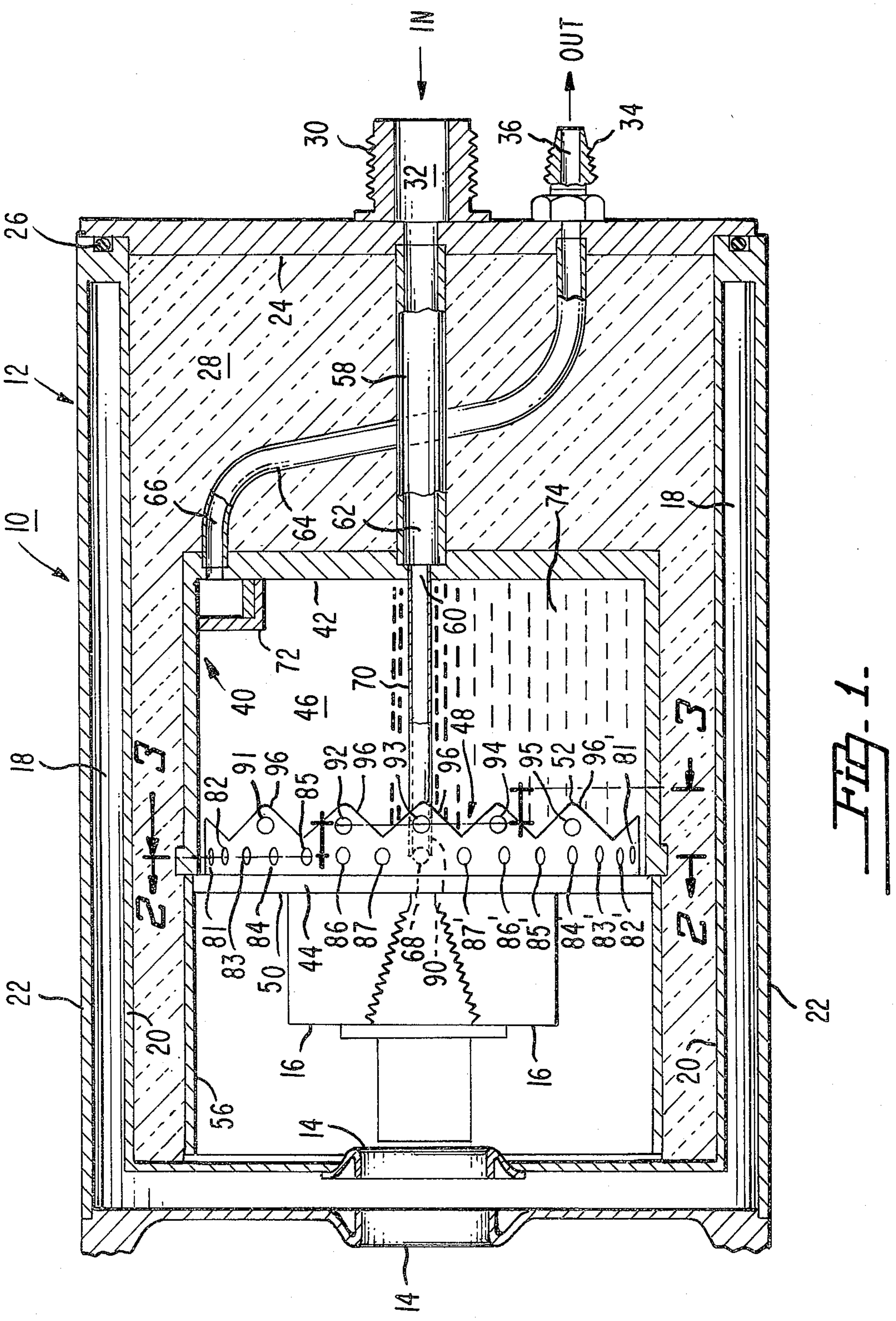

In FIG. 1 dewar assembly 10 comprises an outer thermally insulating double walled housing 12 constructed in a conventional manner and having disposed at one end thereof a pair of optical members 14 for transmitting light therethrough emitted by a laser diode array 16 disposed in optical communication with members 14. Housing 12 is of a vacuum bottle type construction having an evacuated space 18 disposed between the inner and outer walls 20 and 22, respectively. Disposed at the end of the dewar assembly 10 opposite optical members 14 is a sealing plate 24 which is bolted to housing 12 and sealed thereto with sealing gasket 26. Chamber 28 formed by housing 12 is a circular cylindrical cavity which is filled with a suitable insulating material such as urethane foam.

Secured to plate 24 is a liquid nitrogen connecting fitting 30 having an internal conduit 32. Connected to fitting 30 is a suitable mating fitting (not shown) arranged for connecting a source of liquid nitrogen to the internal fitting conduit 32. Fitting 30 is connected on the ambient or exterior side of plate 24. A second fitting 34 is connected to plate 24 to provide a nitrogen gas exhaust vent conduit 36 to the ambient. Fittings 30 and 34 are conventional.

Disposed within chamber 28 is inner cylindrical housing 40 sealed at one end by plate 42 and at the other end by a thermally conductive cooling head member 48. Housing 40 forms a hermetically sealed chamber 46 which is partially filled with nitrogen during the operation of the dewar 10 in a manner to be explained. Chamber 46 is sealed in a suitable manner to permit both liquid and gaseous nitrogen to exist therein without leakage into chamber 28.

One surface 50 of cooling head 48 external of the chamber 46 is planar. A second surface 52 of head 48 is formed with a plurality of parallel, triangular shaped fin members, forming a plurality of parallel troughs and crests triangular in cross section. A further description of cooling head 48 will be provided later in conjunction with FIG. 2 and FIG. 3.

Mounted outside chamber 46 on surface 50 and thermally conductive with head 48 is laser diode array 16. Mounting of the laser diode array 16 to surface 50 is conventional. Disposed about the diode array 16, surface 50 and the inner optical member 14 is cylindrical housing 56. Housing 56 is sealed at the surface 50 of the head member 48, the surface 50 being shown in FIG. 1 as part of a flange 44 on the member 48. The housing 56 is in close proximity to inner wall 20 of housing 12 as shown. Housing 56 allows an annulus of urethane foam insulation to be provided around the diode arrays 16. Sealed to plate 42 is an elongated steel conduit 58 for supplying liquid nitrogen through chamber 28. Conduit 58 connects fitting cavity 32 with nitrogen inlet hole 60 in plate 42. Conduit 58 also helps to mechanically support housing 40 as does the urethane foam within chamber 28. Conduit 58 is secured at each end to the respective plates 24 and 42 to provide a pressure sealed conduit between hole 60 and cavity 32.

A second conduit 64 is interconnected between hole 66 in plate 42 and cavity 36 in fitting 34 for exhausting nitrogen through chamber 28 to the ambient. Conduit 58 supplies liquid nitrogen to cooling head 48 while conduit 64 exhausts nitrogen gas from chamber 46.

Disposed in chamber 46 interconnected between hole 60 and conduit 68 of cooling head 48 is conduit 70. Conduit 70 is connected between hole 60 and conduit 68 to supply liquid nitrogen to conduit 68 without leakage to chamber 46. Disposed in chamber 46 and adjacent hole 66 is a liquid nitrogen sensor 72. Sensor 72 is a conventional device which senses the level of liquid nitrogen within chamber 46 and which provides a shutoff valve operation to hole 66 should the liquid nitrogen approach the level of hole 66. This prevents the escape of liquid nitrogen from chamber 46 and the accompanying waste of the cooling capacity of the dewar 10. Sensor 72 controls a solenoid control valve (not shown) which controls the flow of liquid nitrogen and thus permits only gaseous nitrogen to escape via conduit 64 to the ambient. In use, chamber 46 is at least partially filled with liquid nitrogen 74.

Figure 2:
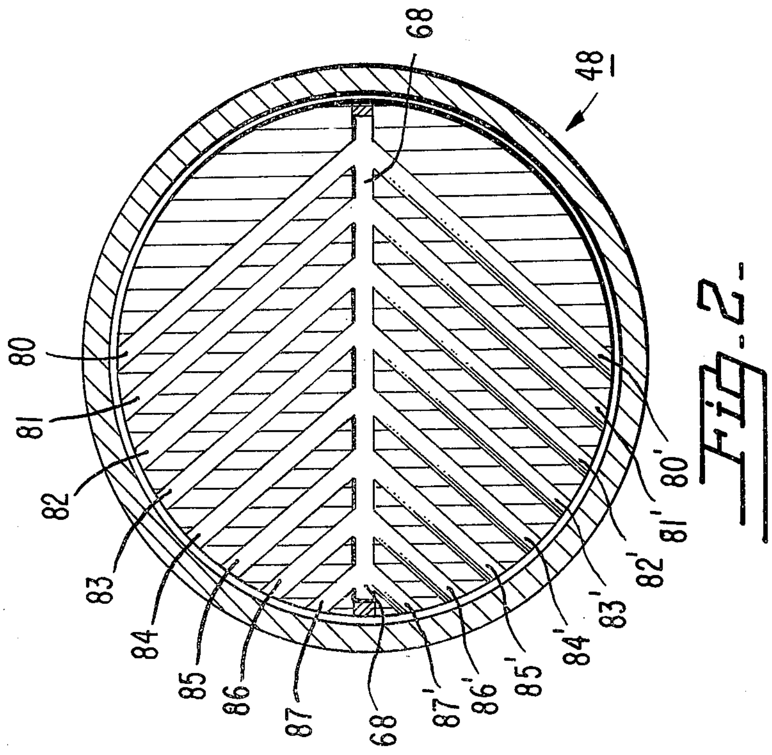
Figure 3:
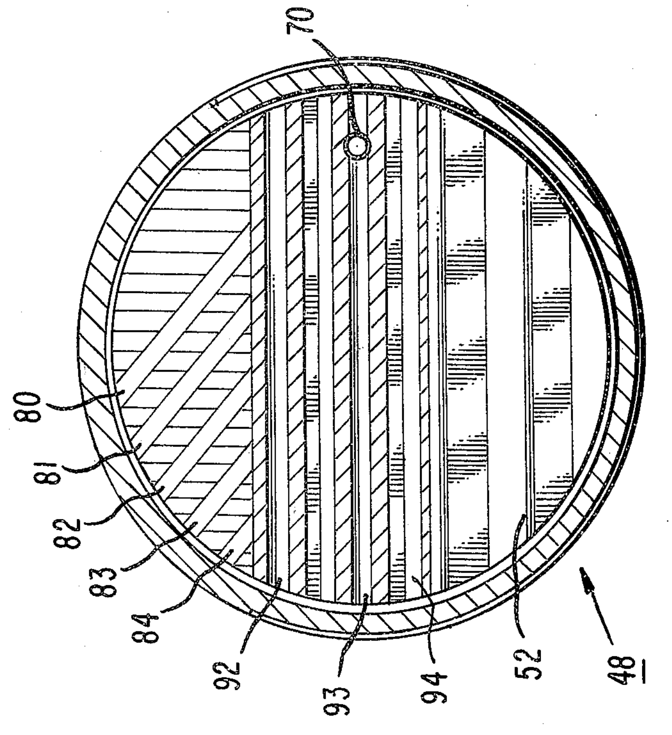

Head member 48 is provided with a unique construction which enhances the cooling capacity thereof inexpensively and simply. This structure, as seen in FIG. 2, comprises a plurality of elongated conduits 80–87, inclusive, which are parallel to each other and which are connected in communication at one end thereof with conduit 68 which is a straight elongated conduit centrally disposed within head 48 and parallel to planar surface 50 (FIG. 1). The other ends of the conduits 80–87 are open in communication with chamber 46. Each of conduits 80 through 87 are disposed at the same angle with elongated conduit 68, as shown. Mirror images of conduits 80–87 are provided by conduits 80′–87′ which correspond in size and length with respective conduits 80–87. Each of conduits 80′–87′ are in communication at one end thereof with conduit 68 and the other end thereof is open to chamber 46. The uniqueness of this structure is the differing lengths of the conduits 80–87 among themselves. The same difference in lengths among the conduits 80–87 exists among conduits 80′–87′. Conduit 68 is disposed completely within cooling head member 48 and is interconnected at end 90 in a conventional manner to conduit 70 (FIG. 1). Both ends of conduit 68 are sealed from direct communication with chamber 46.

As a result, a liquid nitrogen input flow path is provided through cavity 32 in fitting 30 (FIG. 1), cavity 62 in conduit 58, hole 60 and through conduit 70 to conduit 68. From conduit 68 the liquid nitrogen is forced to flow through each conduit 80–87 and 80′–87′ to chamber 46.

The reason for this structure is as follows. Liquid nitrogen performs the task of cooling and, in so acting, is converted from the liquid state to the gaseous state. However, conversion of liquid nitrogen to a gas involves rapid expansion of the gas. When this expansion occurs within a conduit, a pressure blockage is developed within the conduit which provides a back pressure to the flowing liquid nitrogen and therefore provides an impedance to the flowing liquid nitrogen which tends to halt the flow thereof. As a result, it has not been the usual practice to provide liquid nitrogen as a cooling medium within conduits.

The rapid expansion of the gaseous nitrogen as it evaporates from the liquid state and its accompanying blockage of the passages in which the liquid is disposed is a problem which is overcome by the configuration provided including head member 48. This blockage of the nitrogen is prevented by a self-regulating pressure feature due to the presence of the different length conduits 80–87 and 80′–87′. That is, as liquid nitrogen in one of the conduits, for example along conduit 80, evaporates and provides a high pressure blockage to conduit 80, the liquid is still free to flow through shorter conduits 81–87 relieving the pressure provided by evaporated nitrogen in conduit 80. As the liquid nitrogen flows through these other conduits, evaporation will take place in those conduits causing a blockage in certain ones thereof. Meanwhile the reduced pressure in the conduit 80 has eliminated the high pressure blockage and the liquid nitrogen will again flow in conduit 80.

As a result, the different length conduits presented on each side of conduit 68 provide an oscillation of the flow of liquid nitrogen among the different conduits. This oscillation takes place on both sides of conduit 68 among conduits 80–87 and 80′–87′. This oscillation of the flow stabilizes at a given backup pressure within the inlet conduit 70 (FIG. 1) while at the same time providing improved cooling of head member 48. The improved cooling is provided by the addition of the plurality of conduits disposed within the cooling head and the surface contact of the cooling surface 52 of head 48 with the liquid or gaseous nitrogen disposed within the chamber 46.

As seen in FIG. 2, the conduits 80–87, 80′–87′ and 68 form a generally symmetrical herringbone pattern. This symmetrical pattern provides both a regulated flow of liquid nitrogen and uniform cooling of the head to a degree not possible in the prior art with liquid nitrogen cooling devices. As a result, a lower overall pressure can be utilized to pump the liquid nitrogen through the various conduits of head member 48, FIG. 2, than would otherwise be possible if all of the conduits were made uniformly the same size. This permits a spacecraft package to have lower pump capacity requirements and therefore a lighter weight construction than heretofore possible.

As an additional feature, a plurality of conduits 91–95 are provided in each of the fins 96. These conduits 91–95 extend in communication at both ends thereof with chamber 46. This may best be seen in FIG. 3. Conduits 91–95 provide even further cooling to head member 48.

In operation, liquid nitrogen is applied to fitting 30 by conventional means such as liquid nitrogen in a storage cylinder or the like, under pressure. The liquid is applied through conduit 58 and conduit 70 to head member 48 to conduit 68. The liquid nitrogen then flows through conduit 68 radially outwardly to chamber 46 through selected ones of conduits 80–87 and 80′–87′, in accordance with the pressure of the nitrogen within certain of the radially extended conduits. As pointed out above, as the pressure builds up in certain of these conduits due to evaporation of the nitrogen therein, the flow continues through other of the conduits which due to their differing lengths permit the flow to continue since no evaporation has taken place. Since conduits 80–87 and 80′–87′ and 68 are parallel to the cooling surface 50 of head 48, then for a given rate of cooling, the liquid nitrogen as it flows through each of the conduits 80–87 and 80′–87′ will evaporate after a given length of travel through those conduits. If evaporation takes place slowly so that it occurs when the liquid is nearing the egress port of say conduit 80 and 80′, then the liquid will still be flowing completely through the remaining shorter conduits 81–87 and 81′–87′. However, due to evaporation of the nitrogen within conduits 80 and 80′, the build-up of pressure stops the flow of liquid nitrogen therein and causes the other conduits to assume a greater cooling load. As a result, evaporation will increase in each of the other conduits. This evaporation will eventually block the longer of these other conduits. When this blockage occurs, the flow continues to the others which will assume an even further increase in cooling load. This further increase in cooling load further increases the evaporation rate and causes blockage of those additional conduits. Meanwhile, since the nitrogen is continuing to flow through the unblocked conduits, there is a pressure relief vent action by these other conduits. The original conduits, for example conduits 80 and 80′, which are first blocked by the high pressure evaporated nitrogen are then freed as the conduit blocking high pressure gaseous nitrogen escapes from the ends of conduits 80 and 80′ to chamber 46. Conduits 80 to 80′ being free of the pressure blockage permit the flow of liquid nitrogen therethrough. This flow, in turn, relieves the pressure blockage which might occur in the shorter conduits, such as conduits 86 and 86′. This oscillation of flow continues and therefore regulates the pressure among all the conduits at a much lower pressure than otherwise possible if all other conduits were of the same length.

While a herringbone pattern of conduits has been shown, it will be appreciated that other patterns of conduits of differing lengths may also be provided.

What is claimed is:

1. A cryogenic cooling apparatus using liquid cryogen as a cooling medium comprising:

a cooling chamber thermally isolated from the ambient, a thermally conductive heat transfer member including cooling means disposed within said chamber, said cooling means having a plurality of conduits, each conduit communicating within said member with the remaining conduits at one end of said conduits, the other end of each said conduit being in respective, separate communication with said chamber, said member having a surface thereof outside said chamber thermally conductive with said cooling means for cooling an object thermally connected to said surface, liquid cryogen inlet means connected to said conduit one ends for dispensing said liquid cryogen under pressure to said communicating one ends and for forcing said cryogen to flow through said conduits to said other end of said conduits, and cryogen gas exhaust means connected to said chamber for removing evaporated cryogen from said chamber to thereby provide continuous cooling by said liquid cryogen within said conduits.

2. The apparatus of claim 1 wherein the conduits have volumes of different magnitudes so as to regulate the flow of said cryogen through said member.

3. The apparatus of claim 1 wherein a first conduit is disposed within said member, said first conduit being in communication with said inlet means, said plurality of conduits each having said one end in communication with said first conduit.

4. The apparatus of claim 3 wherein said first conduit is substantially centrally disposed within said member, said plurality of conduits extending radially outwardly from said first conduit to said chamber to form a plurality of different length conduits, said different lengths tending to regulate the flow of said cryogen through said conduits.

5. The apparatus of claim 1 further including another plurality of conduits disposed in said member intermediate said first-mentioned plurality of conduits and said chamber, said another plurality of conduits having the ends thereof communicating with said chamber.

6. The apparatus of claim 1 wherein said cooling means includes a plurality of heat transfer fins disposed on one side of said member in communication with said chamber, the side of said member opposite said fins forming said surface, said conduits being disposed intermediate said opposite sides.

7. An apparatus for cryogenic cooling a device mounted in thermal conductivity therewith comprising:

a thermally insulated chamber, and a thermally conductive heat transfer member including cooling means disposed within said chamber, said cooling means having a plurality of conduits, each conduit terminating at one end within said chamber and terminating by communication means with the other conduits at its other end within said member, said communication means including inlet means for receiving a pressurized cryogenic cooling liquid, the pressure of said liquid forcing said liquid through said conduits, said chamber including exhaust means for exhausting in the evaporated state said received liquid forced from said inlet means through said conduits to said chamber, said member having a surface thereof thermally conductive with said cooling means and arranged for said device to be thermally conductively mounted on said surface external said chamber.

8. The apparatus of claim 7 wherein one of said conduits has a length different than a second different one of said conduits to thereby maintain the flow pressure of said liquid through said conduits substantially uniform.

9. The apparatus of claim 8 wherein said conduits are disposed in ordinal spaced relationship with respect to the lengths of said conduits.

10. A cryogenic apparatus for cooling an array of GaAs diodes comprising:

a first outer chamber thermally insulated from the surrounding ambient, a second inner chamber disposed within said first outer chamber, said second chamber being arranged for containing a liquid at cryogenic temperatures, a thermally conductive diode cooling head including cooling means disposed within said second chamber for cooling said head, said cooling means having a plurality of pressurized liquid passing conduits of differing lengths in communication with said second chamber at one end of said conduits, the other ends of said conduits being arranged to receive said cryogenic liquid under pressure, said cooling head including a surface external to said second chamber supporting said diodes and by which said diodes are thermally conductively connected to said cooling means, means connected between said first chamber and said cooling head for supplying said cryogenic liquid under pressure to said conduits other ends for forcing said liquid to flow through said conduits, and means connected between said first and second chambers for exhausting said liquid in the evaporated state from said second chamber.

11. A cryogenic cooling apparatus using a liquid cryogen as a cooling medium comprising:

a cooling chamber thermally isolated from the ambient, a thermally conductive heat transfer member including cooling means disposed within said chamber, said cooling means having a plurality of conduits, said member having a surface thereof outside said chamber thermally conductive with said cooling means for cooling an object thermally connected to said surface, a first of said conduits being substantially centrally disposed within said member, said remaining plurality of conduits each having one end in communication within said member with said first conduit and extending radially outwardly from said first conduit with the other end of each conduit in respective, separate communication with said chamber to form a plurality of different length conduits, said different lengths tending to regulate the flow of said cryogen through said conduits, said plurality of conduits being disposed substantially parallel to each other at an acute angle with respect to said first conduit to form a herringbone pattern within said member, liquid cryogen inlet means connected to said first conduit for dispensing said liquid cryogen to said communicating conduit's one ends, and cryogen gas exhaust means connected to said chamber for removing evaporated cryogen from said chamber to thereby provide continuous cooling by said liquid cryogen within said conduits.

12. A cooling device comprising:

a chamber, a thermally conductive heat transfer member disposed in thermal communication within and without said chamber, and means for supplying a pressurized liquid cryogen to said heat transfer member for cooling a heat load secured to said member without said chamber, said heat transfer member having a plurality of conduits disposed therein, said conduits having solely first and second ends with each conduit terminating at one end in communication with said chamber and at the other end in communication with the other ends of all other of said conduits, said supplying means supplying said pressurized liquid cryogen to said communicating conduit's other ends for forcing said cryogen to flow through said conduits into said chamber.

* * * * *

UNITED STATES PATENT OFFICE

CERTIFICATE OF CORRECTION

PATENT NO. : 3,909,225

DATED : September 30, 1975

INVENTOR(S) : Robert Edward Rooney

It is certified that error appears in the above-identified patent and that said Letters Patent are hereby corrected as shown below:

TITLE PAGE:

Item [73] Assignees - delete "Robert Edward Rooney, Danvers, Mass.;"

Signed and Sealed this

*fourth* Day of *May 1976*

[SEAL]

*Attest:*

RUTH C. MASON
*Attesting Officer*

C. MARSHALL DANN
*Commissioner of Patents and Trademarks*